United States Patent [19]

Monti

[11] Patent Number: 5,013,892
[45] Date of Patent: May 7, 1991

[54] ELECTRICAL MELTING APPARATUS OF CONFECTIONERY PRODUCTS

[76] Inventor: Anthony Monti, 28 Dogwood La., Irvington, N.Y. 10533

[21] Appl. No.: 233,816

[22] Filed: Aug. 18, 1988

[51] Int. Cl.5 .......................... H05B 3/22; H05B 3/42
[52] U.S. Cl. .................................................. 219/421
[58] Field of Search ............... 219/421, 422, 426, 427, 219/267; 222/146.5; 126/343.5 A, 343.5 R

[56] References Cited

U.S. PATENT DOCUMENTS

| | | | |
|---|---|---|---|
| 475,442 | 5/1892 | Cuttriss | 219/421 |
| 1,961,136 | 6/1934 | Cretors | 219/421 |
| 2,843,721 | 7/1958 | Foor | 219/426 |
| 3,032,635 | 5/1962 | Kraft | 126/343.5 A |
| 3,156,199 | 11/1964 | Buckle | 219/267 |
| 3,197,813 | 8/1965 | Le Grand | 126/343.5 A |
| 3,377,466 | 4/1968 | Paulsen | 219/421 |
| 3,756,141 | 9/1973 | Rose | 219/421 |
| 3,853,410 | 12/1974 | Busoni | 222/146.5 |
| 4,771,920 | 9/1988 | Boccagno et al. | 219/421 |

Primary Examiner—Geoffrey S. Evans

[57] ABSTRACT

A confectionery apparatus that employs the fusion of foodstuffs brought about by direct contact between ingredients and electrical heating rods, in a unique melter that employs a monolayer of electrical heating that are uniformly separated from each other to form a porous layer in which the molten product can quickly pass thru and out of the heating zone so as to avoid the deleterious effects of excessive heating time.

1 Claim, 1 Drawing Sheet

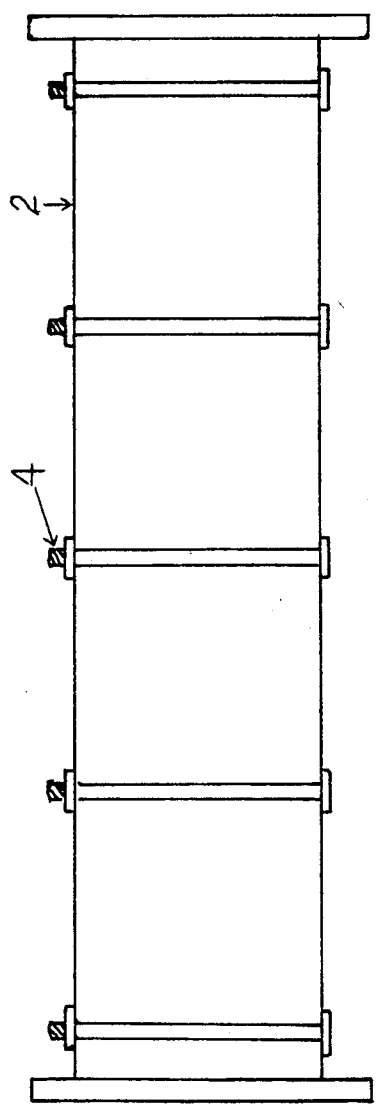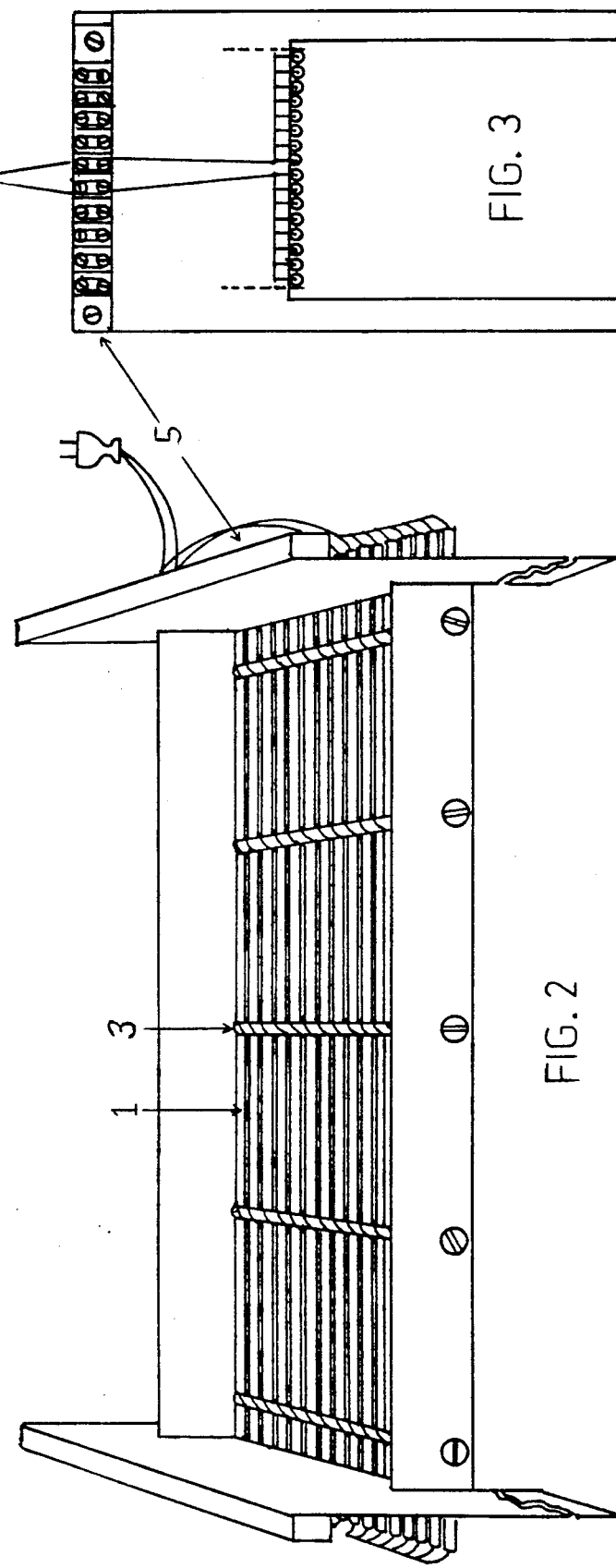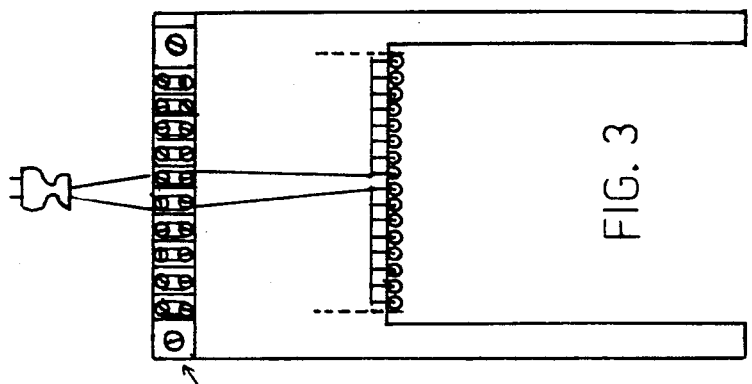

ELECTRICAL MELTING APPARATUS OF CONFECTIONERY PRODUCTS

TECHNICAL FIELD

The present invention is concerned with a novel method of producing confectionery products. More particularly, this invention is concerned with a novel confectionery production process and apparatus that employs the fusion of ingredients and blends of ingredients by electrically produced heat to produce various confectionery products.

BACKGROUND ART

The majority of confectionery processes require a primary step that involves the dissolution of sugar with or without additives in water. The resulting blend is then heated in various pieces of apparatus such as open kettles at atmospheric pressure or in closed vessels under vacuum or in thin film evaporators with or without vacuum and with or without scraping vanes. One of the primary functions of the cooking process is to evaporate off enough water to produce the proper consistency in the final product. Cooking in open vessels is a slow tedious labor intensive process. Thin film evaporation is much faster but involves the use of very expensive equipment.

For example when a hard candy batch is made in an open kettle, the sugars are dissolved in approximately 20% water after which the solution is boiled until the water content is reduced to approximately 1%. During the boiling process an operator has to continually wash down syrup that splashes on the side of the vessel in order to prevent that portion from crystallizing which would reduce the clarity of the entire batch.

In production of hard candy with a thin film evaporator it is advisable to use stainless steel on the evaporating surfaces for sanitary reasons. The vessel has to be composed of sturdy walls because it is usually advisable to evaporate under vacuum to prevent excessive color formation. The walls must be rigid in order to maintain almost perfect smoothness on the evaporating surface and the proper clearance especially when vanes are used. A pump is used to deliver the syrup to the evaporator and another pump is used to remove the concentrated product. A condenser is also necessary in order to remove the resulting vapors from the evaporation process. As is evident these processes are expensive either due to the labor involved or to the sophistication of the equipment required in automated systems.

SUMMARY OF THE INVENTION

It is an object of the present invention to provide a simple production process for confectionery products.

It is another object of this invention to provide a production process for confectionery products which requires the use of very simple equipment.

It is another object of this invention to provide a production process for confectionery products at considerably less cost than is presently possible.

Still another object of the present invention will be evident from the ensuing specifications, examples and claims.

The present invention involves the use of a unique melter which employs a principle that has not been known or employed in the confectionery industry. I have found that sucrose and other fusible foodstuffs can be placed in direct contact with electrical heating rods or electrically heated wire and melted with no danger of scorching even when the electrical energy input to the heating rods or heating wire is increased to a level that would normally produce surface temperatures on the rods or wire that are above the scorching temperature of the sucrose or other foodstuff. I have produced an apparatus for producing confectionery products by aligning sixteen electrical heating rods supplied by Chromalox Industrial Heating Products of Pittsburgh, Pa., side by side in a monolayer with gaps between the rods that are wide enough to allow molten foodstuffs such as sucrose to flow thru the gaps & sufficiently narrow to prevent the continuous flow of unmolten solid foodstuffs thru the gaps. These rods are Chromalox type TSMM which are 0.2" in diameter and 18" long and have an electrical rating of 300 watts at 115 VAC. The rods are held together by five bolts which are 0.2" in diameter and 4¼" long and positioned across the top of the rods perpendicular to the lengthwise position of the rods and evenly separated from each other. The rods are attached to the bolts by #20 galvanized wire which is weaved under the rods and over the bolts. The #20 wire is just thick enough to produce 0.05" gaps between the rods which is wide enough to allow molten sucrose to pass thru the gaps but narrow enough to prevent unmolten solid sucrose from flowing thru the gaps. This monolayer of rods is bordered by steel side plates and steel end plates to form an open top rectangular box with a porous bottom made up of the monolayer of rods. This monolayer is held in place by passing the bolts thru holes in the side plates. The end plates are attached to the side plates with corner angles and supported on steel legs.

Various electrical connections may be made to supply the proper electrical energy to the rods for heat production. I chose to use eight parallel paths of two rods in series and used a Powerstat with an electrical rating 7½ maximum amperage at 115 VAC to vary the voltage and amperage input.

In a surprising result, I have found that as I increased the electrical input of the heating rods or heating wires upon which sucrose rested, the fused result of the heating process showed less rather than more deterioration, in the form of color development, due to heat.

I believe that the reason for this surprising result is due to the unique qualities of my melting apparatus. The apparatus is designed so that the fusion takes place in a very shallow area, measuring 0.2" or less in depth after which the foodstuff immediately drops out of the heating zone. In the very acts of melting and dropping away from the heating zone the foodstuff removes heat units from the heating rods or heating wires and thereby prevents them from overheating. When the electrical energy to the heating rods or heating wires is increased, the rods or wires melt the foodstuff at a faster rate so heat units are removed at a faster rate and the system becomes self limiting as far as the temperature level is concerned. The fusion of sucrose and similar ingredients results in the formation of a hard candy which is the chemical equivalent of hard candy produced in the normal procedure wherein water is added for dissolution of sugar and then removed by evaporation. This fusion process used no water so the difficulties due to the addition of water mentioned in the prior art section are eliminated.

In my apparatus there is nothing such as walls, plates or flat foil to significantly separate the source of heat from the material to be fused. The elimination of intervening material, removes what would be a hindrance to the free flow of the molten product out of the heating zone. If I had used a separating wall, plate, or foil the hindrance to free flow would have increased the residence time in the heating zone and deterioration in the form of color development would have increased.

The heating rods or wires can be laid out in a monolayer horizontally, vertically, inclined, in a circle, in the form of a cone or in an accordian shape as long as space is provided between adjacent rods or wires to allow the free flow of molten material out of the heating zone without delay. Heating wire can be woven into a screen which would have more open area for the molten product to pass thru per unit area than is possible with heating rods.

BRIEF DESCRIPTION OF THE DRAWINGS

FIG. 1 is a top view of the frame that holds the heating rods in a horizontal plane. In FIG. 1, the heating rods are not shown so that the configuration of the frame may be seen more clearly.

FIG. 2 is an elevated side view of the apparatus with the heating rods installed. Electrical connecting wires extend from the ends of the heating rods to the electrical terminal boards at the top of each end plate.

FIG. 3 is an end view of the apparatus that more clearly shows the connecting wires extending from the ends of the heating rods (small circles at lower end of wires) up to the screws in the electrical terminal board. This view also shows the supporting legs of the apparatus (1" wide) as being an integral part of the end plates.

Best Mode for Carrying out the Invention

The drawing shows the top, side, and end view of an apparatus that utilizes the basic principle of this invention.

In essence, the apparatus comprises a monolayer bed of 16 electrical heating rods (1) (chromalox type TSMM -0.2" diameter - stainless steel sheath - 115 VAC - 300 W) arranged horizontally with 0.05" clearance between adjacent rods. The rest of the apparatus consists of a steel box (2) on legs which serves to hold the heating rods in position and also acts as a feed hopper for the fusible foodstuff. Weaving 20 gauge wire (3) between the rods and over the supporting bolts (4) served very well to give the proper clearance between the adjacent rods. The terminal strips (5) were attached to the ends of the box to make the proper electrical connections which gave a system in which the current passed thru 8 parallel paths that were each composed of two rods in series. A powerstat (115 VAC - 7.5 AMPS) was used to deliver various levels of electrical energy to the rods.

The above description shall not be construed as limiting the ways in which this invention may be practiced but shall be inclusive of many other variations that do not depart from the broad interest and intent of the invention.

Having generally described the invention, the following examples are presented as being illustrative of the practice of the present invention.

EXAMPLE 1

The steel box above the rods was filled with regular granulated sugar. The powerstat was adjusted to various voltages and the melted droplets that fell out of the heating zone were observed for production rate, clarity and color. The results were as follows:

| Voltage | Amperage | Wattage | Rate | Clarity | Color |
|---|---|---|---|---|---|
| 57 | 3.65 | 208 | — | Clear | dark amber |
| 70 | 4.7 | 329 | 3.75 lb/hr | Clear | light amber |
| 75 | 5.0 | 375 | — | Clear | yellow |
| 85 | 5.4 | 459 | 7.75 lb/hr | Clear | light yellow |
| 100 | 6.6 | 660 | 11.9 lb/hr | Clear | pale yellow |

The droplets dropped onto a non-stick baking pan where they immediately solidified and were removed as individual droplets. Another portion was allowed to accumulate on aluminum foil that lay on a wooden surface to insulate the batch in order to present cooling and solidification. This portion formed a typical mass of hard candy ready for forming.

EXAMPLE 2

The steel box was filled with a powdered sugar that contained 3% corn starch. When the powerstat was adjusted to give 100 volts, a product similar to the pale yellow product of example 1 was produced except for the presence of a slight haze due to the corn starch.

EXAMPLE 3

The steel box was filled with a commercial blend of sucrose, malic acid, cherry flavor, red color and other minor ingredients which is sold under the trade name of Penguin and distributed by Grand Union. It is designed to be mixed with water to produce a cherry flavored soft drink. The powerstat was adjusted to give 100 volts. The resulting product was clear bright red droplets that were very tasty.

EXAMPLE 4

The steel box was filled with American Sugar's free flowing brown sugar sold under the trade name of Brownulated. The powerstat was adjusted to 100 volts. The resulting product was a glossy opaque brown droplet with a flavor that was typical of brown sugar.

EXAMPLE 5

The steel box was filled with a blend of dry levulose and Nestles cocoa in a ratio of 9 parts levulose to 1 part cocoa. The powerstat was adjusted to give 85 volts. The resulting product was solidified opaque droplets which had a very pleasant chocolate flavor and a very attractive glossy chocolate color.

I claim:
1. An electrical melting apparatus for confectionery production consisting of a single monolayer of adjacent electrical heating rods in the order of 0.2" in diameter, spaced apart to form gaps between the rods that are narrow enough to prevent the free flow of unmelted foodstuffs thru the gaps and wide enough to allow the free flow of the molten foodstuffs thru the gaps after the heat of the rods has melted the foodstuffs, the gaps being in the order of 0.05" wide, said rods forming a porous bottom of a open top container that serves both as a support for the rods and a reservoir for unmelted foodstuffs.

* * * * *